US006769616B2

(12) United States Patent
Fu et al.

(10) Patent No.: US 6,769,616 B2
(45) Date of Patent: Aug. 3, 2004

(54) BIDIRECTIONAL MEMS SCANNING MIRROR WITH TUNABLE NATURAL FREQUENCY

(75) Inventors: Yee-Chung Fu, Fremont, CA (US); Ting-Tung Kuo, San Jose, CA (US)

(73) Assignee: Advanced Nano Systems, San Jose, CA (US)

( * ) Notice: Subject to any disclaimer, the term of this patent is extended or adjusted under 35 U.S.C. 154(b) by 30 days.

(21) Appl. No.: 10/302,387

(22) Filed: Nov. 22, 2002

(65) Prior Publication Data

US 2004/0099739 A1 May 27, 2004

(51) Int. Cl.$^7$ .............................. G06K 7/10; G06K 7/14
(52) U.S. Cl. .................. 235/454; 235/454; 235/462.36; 310/309
(58) Field of Search .......................... 235/454, 462.36; 310/309

(56) References Cited

U.S. PATENT DOCUMENTS

| | | | | |
|---|---|---|---|---|
| 5,963,367 A | * | 10/1999 | Aksyuk et al. | 359/392 |
| 6,088,145 A | | 7/2000 | Dickensheets et al. | 359/196 |
| 6,155,490 A | | 12/2000 | Ackley | 235/472.01 |
| 6,535,318 B1 | * | 3/2003 | Wood et al. | 359/224 |
| 6,612,029 B2 | * | 9/2003 | Behin et al. | 29/847 |

OTHER PUBLICATIONS

US patent application Publlication No. US 2002/0158548 A1, Publication Date: Oct. 31, 2002.

D. Kee et al., "High-Resolution, High-Speed Microscanner In Single-Crystalline Silicon Actuated By Self-Aligned Dual-Mode Vertical Electrostatic Combdrive With Capability For Phased Array Operation", Transducers '03, the 12$^{th}$ International Conference on Solid State Sensors, Actuators and Microsystems, Boston, Jun. 8–12, 2003, pp. 576–579.

Robert A. Conant et al., "A Flat High-Frequency Scanning Micromirror", Berkeley Sensor & Actuator Center, University of California, Berkeley, Berkeley, CA, 4 pages.

Harald Schenk et al., Large Deflection Micromechanical Scanning Mirrors for Linear Scans and Pattern Generation, IEEE Journal of Selected Topics in Quantum Electronics, vol. 6, No. 5, Sep./Oct. 2000, pp 715–721.

Pamela R. Patterson et al., "A Scanning Micromirror With angular Comb Drive Actuation", Electrical engineering Department, University of California at Los Angeles, Los Angeles, CA; Institute of Industrial Science, University of Tokyo, Tokyo, Japan, pp 544–547.

Meng-Hsiung Kiang et al., "Micromachined Polysilicon Microscanners for Barcod Readers", IEEE Photonics Technology Letters, vol. 8, No. 12, Dec. 1996, pp 1707–1709.

Osamu Tsuboi et al., "A Rotational Comb-Driven Micromirror With A Large deflection Angle And Low Drive Voltage", Fujitsu Laboratories Ltd., pp 532–535.

Hiroshi Miyajima et al., "Product Development Of A Mems Optical Scanner For A Laser Scanning Microscope", Olympus Optical Co., Ltd., Tokyo Japan pp 552–555.

(List continued on next page.)

Primary Examiner—Diane I. Lee
Assistant Examiner—Seung H Lee
(74) Attorney, Agent, or Firm—Patent Law Group LLP; David C. Hsia

(57) ABSTRACT

In one embodiment of the invention, a MEMS structure includes a first electrode, a second electrode, and a mobile element. The first electrode is coupled to a first voltage source. The second electrode is coupled to a second voltage source. The mobile element includes a third electrode coupled to a third voltage source. A steady voltage difference between the first electrode and the third electrode is used to tune the natural frequency of the structure to a scanning frequency of an application. An oscillating voltage difference between the second electrode and the third electrode at the scanning frequency of the application is used to oscillate the mobile element. In one embodiment, the mobile unit is a mirror.

27 Claims, 17 Drawing Sheets

OTHER PUBLICATIONS

Jin–Ho Lee et al., "Design And Fabrication of Scanning Mirror For Laser Display", 2002 Elsevier Science B.V., pp 223–230.

Clark T.–C Nguyen, "Frequency–Selective MEMS for Miniaturized Communications Devices", 1998 IEEE, Department of Electrical Engineering and Computer Science University of Michigan, pp 445–460.

Faiz Sherman et al., "In–Plane Microactuator For fluid Control Application", Electrical Engineering Department University of California, Los Angeles, 6 pages.

* cited by examiner

BIDIRECTIONAL MEMS SCANNING MIRROR WITH TUNABLE NATURAL FREQUENCY

FIELD OF THE INVENTION

This invention relates to micro-electro-mechanical systems (MEMS), and more particularly to MEMS scanning mirrors.

DESCRIPTION OF RELATED ART

Various electrostatic designs for MEMS scanning mirrors have been proposed. Their applications include barcode readers, laser printers, confocal microscopes, fiber-optical network components, projection displays for projectors, rear projection TVs, wearable displays, and military laser tracking and guidance systems. Typically a MEMS scanning mirror is driven at its. main resonance to achieve a high scan angle. Invariably the manufacturing processes produce MEMS scanning mirrors with dimensional inconsistencies that vary the natural frequencies of the individual devices. If the main natural frequency of a minority of the MEMS scanning mirrors is too low or too high, the minority devices will not produce the proper scan speed and the proper scan angle under an alternating current (AC) drive voltage selected for a majority of the MEMS scanning mirrors. Thus, an apparatus and a method are needed to tune the main natural frequency of the MEMS scanning mirrors to improve the manufacturing yield of these devices.

SUMMARY OF THE INVENTION

In one embodiment of the invention, a MEMS structure includes a first electrode, a second electrode, and a mobile element. The first electrode is coupled to a first voltage source. The second electrode is coupled to a second voltage source. The mobile element includes a third electrode coupled to a third voltage source (e.g., an electrical ground). A steady voltage difference between the first electrode and the third electrode is used to tune the natural frequency of the structure to a scanning frequency of an application. An oscillating voltage difference between the second electrode and the third electrode at the scanning frequency of the application is used to oscillate the mobile element. In one embodiment, the mobile element is a mirror.

DETAILED DESCRIPTION

Figure 4:
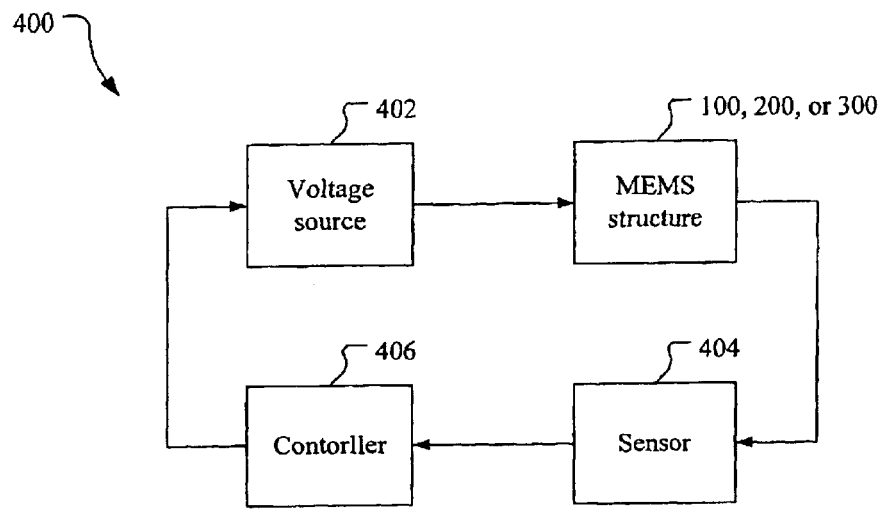
FIG. 4 illustrates a MEMS system in one embodiment of the invention.

FIG. 4 illustrates a MEMS system 400 in one embodiment of the invention. MEMS system 400 includes a MEMS structure (e.g., MEMS structure 100, 200, or 300) with a mobile element that is electrostatically moved under voltages supplied by a voltage source 402. Voltage source 402 provides a voltage difference between a stationary electrode and a moving electrode of the mobile element to adjust the natural frequency of MEMS structure 100 to a desired scanning frequency. Voltage source 402 also provides an AC voltage difference between another stationary electrode and the moving electrode of the mobile element at the desired scanning frequency to oscillate the mobile element with a desired scanning angle.

The movement of the mobile element (e.g., the scanning frequency and the scanning angle) is measured by a sensor 404 and fed back to a controller 406. Controller 406 compares the measured movement to a desired movement of the mobile element and then instructs voltage source 402 to provide the appropriate voltages to achieve the desired movement. Although shown as individual components, MEMS structure 100, voltage source 402, sensor 404, and controller 406 can be build on the same chip or on different chips.

Figure 1A:
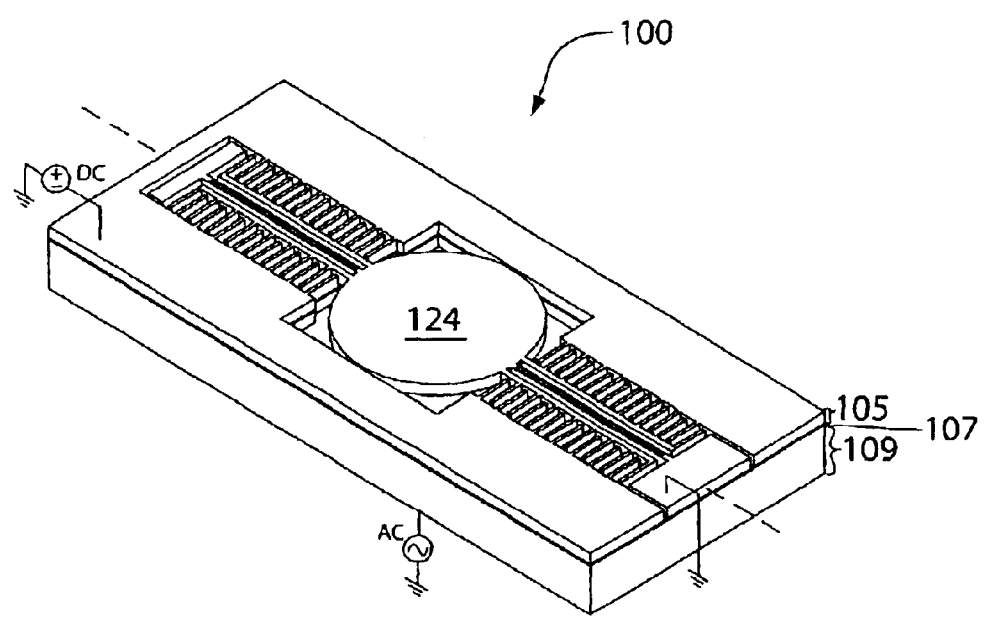
FIGS. 1A and 1B respectively illustrate assembled and exploded views of a MEMS structure 100 in one embodiment.
Figure 1B:
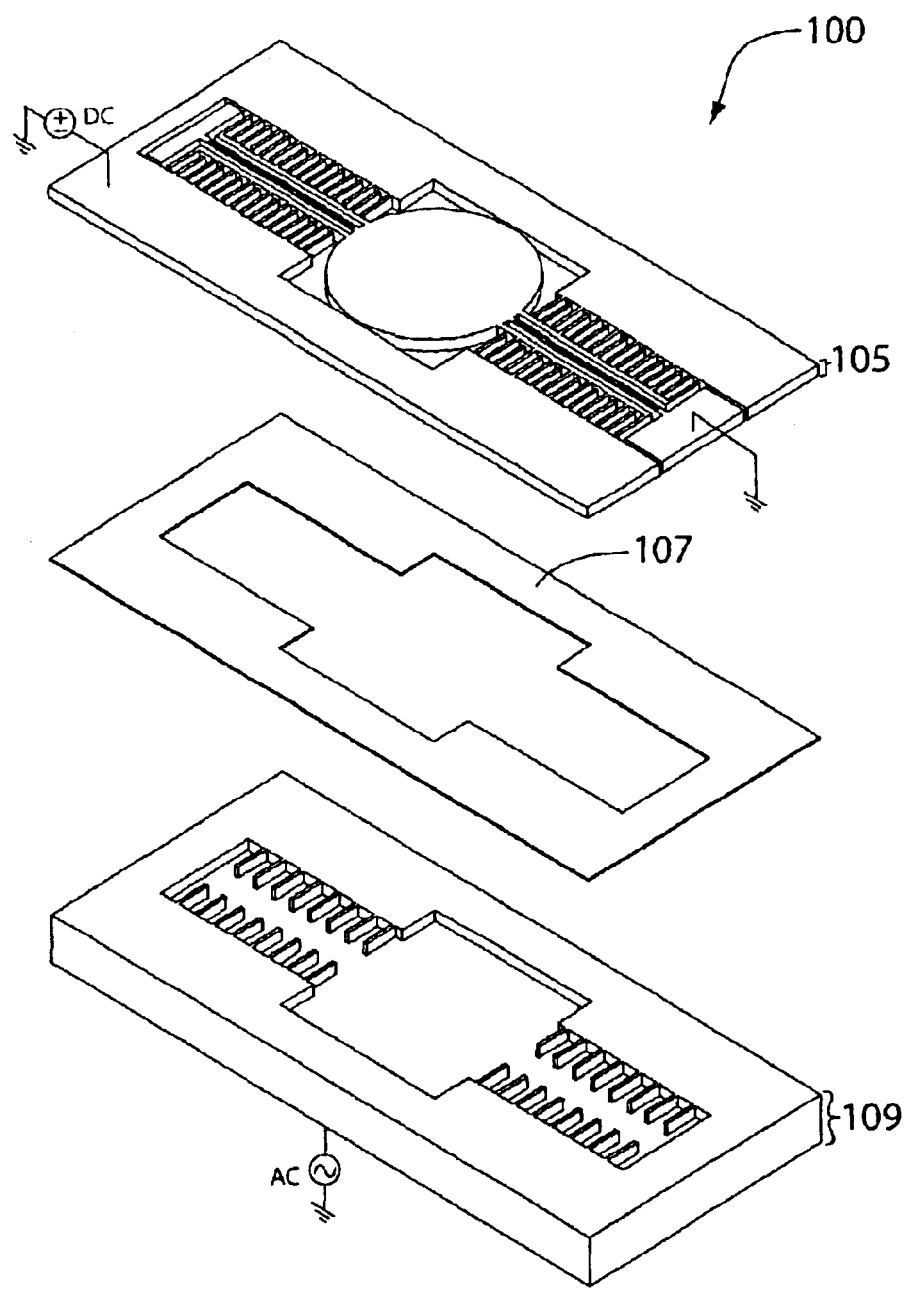

FIGS. 1A and 1B respectively illustrate assembled and exploded views of a MEMS structure 100 in one embodiment. MEMS structure 100 can be used in any application that requires a single axis of motion (e.g., a unidirectional scanning mirror). MEMS structure 100 includes a conductive layer 105, an insulating layer 107, and a conductive layer 109. In one embodiment, conductive layers 105 and 109 are made of doped silicon while insulating layer 107 is made of silicon dioxide ($SiO_2$). Insulating layer 107 electrically insulates components on conductive layers 105 and 109. Insulating layer 107 is also used to physically bond conductive layers 105 and 109.

Figure 1C:
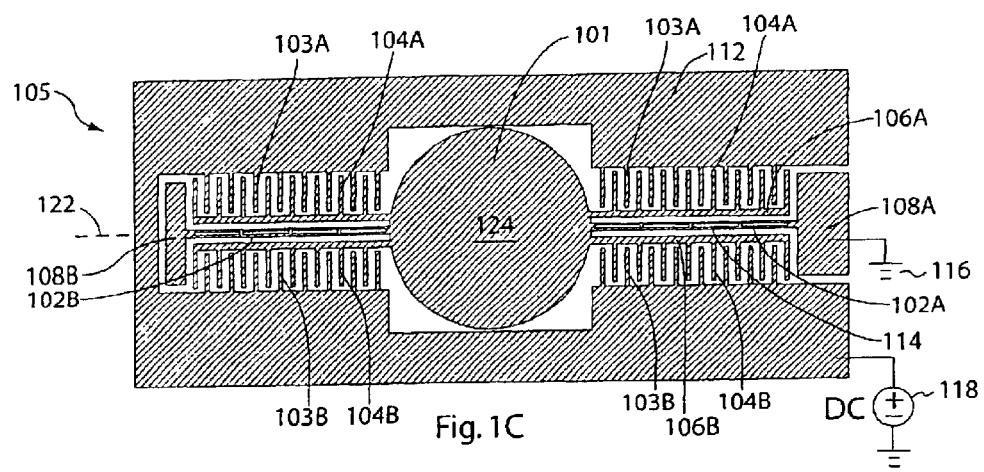
FIGS. 1C, 1D, and 1E illustrate top views of the layers in MEMS structure 100 in one embodiment.

FIG. 1C illustrates a top view of one embodiment of conductive layer 105. Conductive layer 105 includes a scanning mirror 101 and a bias pad 112. Scanning mirror 101 includes a reflective area 124 that is connected by torsion hinges 102A and 102B to anchors 108A and 108B, respectively. Mirror 101 rotates about an axis 122.

In one embodiment, torsion hinges 102A and 102B include internal holes 114 to lower the rotational modal frequency of structure 100. The rotational modal frequency is the lowest of the modal frequencies to ensure scanning mirror 101 rotates about the axis 122 without coupling with other unwanted rotational and translational structural vibrations.

Mirror 101 includes moving teeth 104A and 104B (collectively "moving teeth 104") on different sides of rotational axis 122. Moving teeth 104A and 104B extend from bars 106A and 106B, respectively. Bars 106A and 106B are connected to reflective area 124 and run parallel to torsion hinges 102A and 102B.

Bias pad 112 includes stationary teeth 103A and 103B (collectively "stationary teeth 103") on the different sides of rotational axis 122. Stationary teeth 103A and 103B are respectively interdigitated with moving teeth 104A and 104B when bias pad 112 and mirror 101 are in the same plane (e.g., when mirror 101 is not rotated).

In one embodiment, anchor 108A is coupled to ground 116 and bias pad 112 is coupled to a direct current (DC) voltage source 118. DC voltage source 118 provides a DC bias voltage to bias pad 112. The DC bias voltage creates a steady voltage difference between stationary teeth 103 and moving teeth 104. The steady voltage difference between stationary teeth 103 and moving teeth 104 creates an electrostatic torque that rotates mirror 101 until the electrostatic torque is equal to the restoring torque in an equilibrium position. In effect, the steady voltage difference between stationary teeth 103 and moving teeth 104 creates a nonlinear electrostatic system that changes the natural frequency of MEMS structure 100. Accordingly, the natural frequency of MEMS structure 100 can be adjusted (e.g., tuned) by increasing or decreasing the steady voltage difference between stationary teeth 103 and moving teeth 104.

In one embodiment, DC voltage source 118 is built on the same chip as structure 100. Alternatively, DC voltage source 118 is built on a chip separate from structure 100. In one embodiment, DC voltage source 118 is servo-controlled during operation to generate a DC bias voltage value that produces the desired natural frequency of structure 100.

Figure 1D:
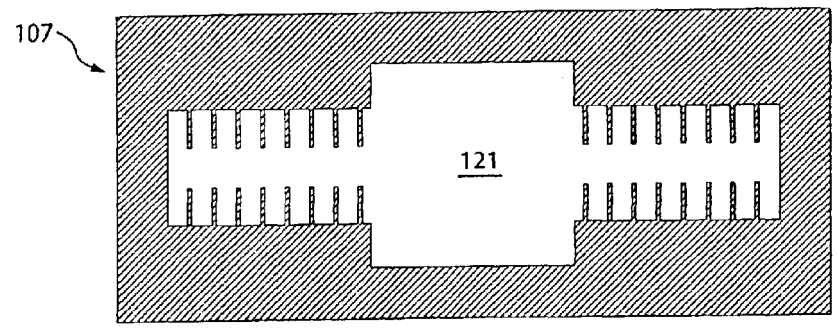

FIG. 1D illustrates a top view of one embodiment of intermediate layer 107. Insulating layer 107 has the same shape as conductive layer 105 but for mirror 101 in order to electrically insulate the components on layer 101. Insulating layer 107 defines a cross-shaped opening 121 for the scanning motion of mirror 101.

Figure 1E:
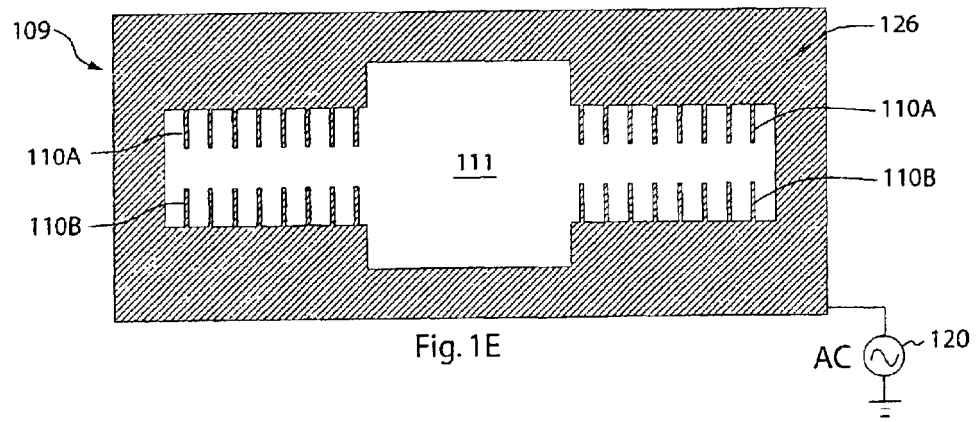

FIG. 1E illustrates a top view of one embodiment of conductive layer 109. Conductive layer 109 includes a drive pad 126 that defines a cross-shaped opening 111. Drive pad 126 includes stationary teeth 110A and 110B (collectively "stationary teeth 110") on the different sides of rotational axis 122. Like opening 121, opening 111 is a free space reserved for the scanning motion of mirror 101 . Stationary teeth 110A are interdigitated with moving teeth 104A when mirror 101 is rotated in a first direction (e.g., clockwise), and stationary teeth 110B are interdigitated with moving teeth 104B when mirror 101 is rotated in a second direction (e.g., counterclockwise). Teeth 110A and 110B are electrically connected. When an AC drive voltage is applied between pads 112 and 126, a translational resultant force is generated initially if the moving structure is symmetrical with respect to axis 122. This translational resultant force is not useful for the rotational motion. In reality, the structure is not completely symmetrical due to the manufacturing tolerance and will start to oscillate. Once the structure starts to oscillate, the torque increases and the translational resultant force decreases. This potential issue of small initial torque can be solved by making the force or the structure slightly asymmetric with respect to axis 122. For example, the length of teeth 110A and 110B can be made slightly different to generate relatively large initial torque. The mirror shape can be made slightly asymmetric with respect to axis 122 to produce the same effect.

In one embodiment, stationary teeth 110 and moving teeth 104 form an electrostatic actuator (e.g., a vertical comb drive actuator) that oscillates scanning mirror 101. In this embodiment, drive pad 126 is coupled to an AC voltage source 120 and anchor 108A is coupled to ground 116. When activated, AC voltage source 120 provides an AC drive voltage to drive pad 126 that creates an oscillating voltage difference between stationary teeth 110 and moving teeth 104. Typically AC drive voltage has a frequency equal to the natural frequency of structure 100 to achieve the maximum scan angle. The oscillating voltage difference between teeth 110 and 104 causes electrostatic torques that create the scanning motion of mirror 101.

In one embodiment, AC voltage source 120 is built on the same chip as structure 100. Alternatively, AC voltage source 120 is built on a chip separate from structure 100. In one embodiment, AC voltage source 120 is servo-controlled during operation to generate an AC drive voltage that produces the desired scanning speed and scanning angle.

Figure 1F:
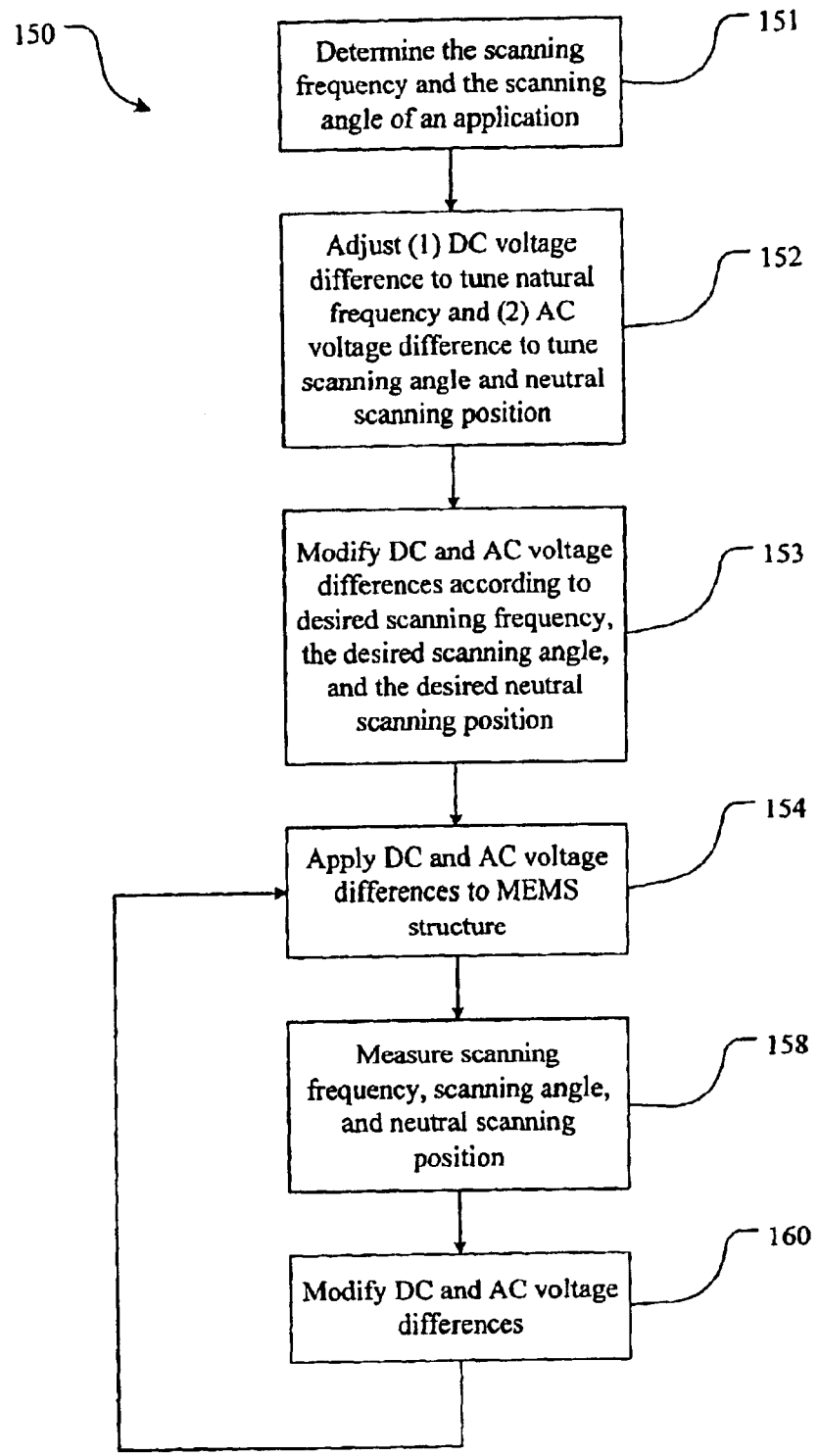
FIG. 1F illustrates a method for configuring and operating MEMS structure 100 in one embodiment of the invention.

FIG. 1F illustrates a method 150 for configuring and operating a MEMS structure 100 in one embodiment. Structure 100 is generally a device from a batch of mass produced structures 100. Described below, actions 151 and 152 occur during the manufacturing of structure 100, and actions 153, 154, 156, and 160 occur during the use of structure 100.

In action 151, a designer determines the scanning frequency and the scanning angle of an application (e.g., 1 kHz and 5–10 degrees for a barcode reader) and modifies the basic design of structure 100 to achieve a specific natural frequency equal to the scanning frequency. The designer modifies the design by changing the stiffness of the hinges (e.g., the geometry of the hinges) or changing the inertia of the structure (e.g., the geometry of the mirror). Action 152 is followed by action 152.

Figure 5:
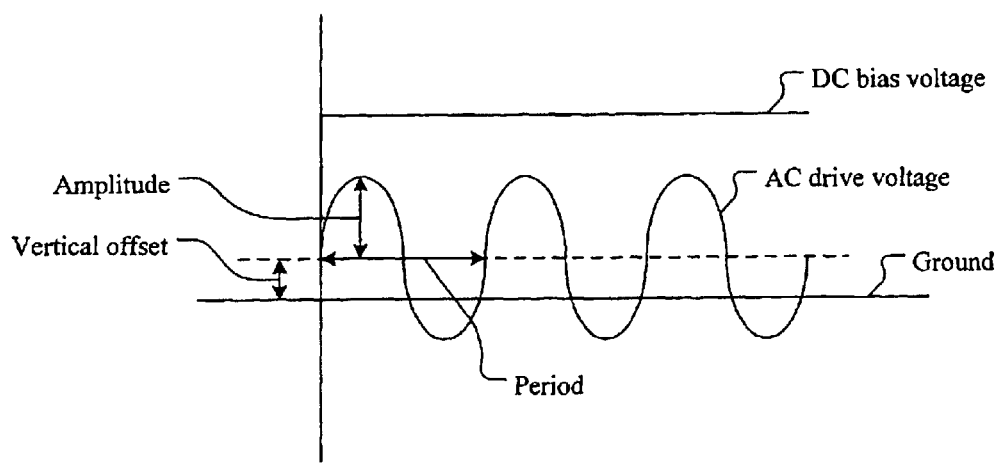
FIG. 5 illustrates DC and AC voltages used to oscillate a MEMS structure in one embodiment of the invention.

In action 152, the designer presets the characteristics of the DC voltage difference and the AC voltage difference for this structure 100. The designer presets the amplitude of the DC bias voltage (FIG. 5) to tune the natural frequency of this structure 100 to the scanning frequency of the application. The designer presets the amplitude and the frequency of the AC drive voltage (FIG. 5) to achieve the desired scan angle for this structure 100. The designer can also preset the vertical offset of the AC drive voltage (FIG. 5) to achieve the desired neutral scanning position about which the oscillation occurs. These steps are necessary because each structure 100 is somewhat different from the others due to manufacturing inconsistencies. These characteristics are then stored into controller 406 for this structure 100 as the initial/default characteristics for the DC bias voltage and the AC drive voltage.

In action 153, an end user may store different characteristics for the DC bias voltage and the AC drive voltage in controller 406. The end user may wish to do so to change the desired scanning frequency, the desired scanning angle, and the desired neutral scanning position.

In action 154, controller 406 instructs voltage source 402 to apply the DC bias voltage and the AC drive voltage. Voltage source 402 represents the various DC and AC voltage sources (e.g., DC voltage source 118 and AC voltage source 120).

The DC bias voltage is initiated with the default values stored in controller 406 and then servo-controlled to ensure the rotational natural frequency is the scanning frequency. Servo-control of the DC bias voltage is necessary in the operational stage because the natural frequency of structure 100 may drift away from the desired value due to temperature changes, material aging, or any other reasons.

The AC drive voltage is initiated with the default values stored in controller 406 and then servo-controlled to ensure the desired scanning frequency and the scanning angle are achieved. Servo-control of the AC drive voltage is necessary in the operational stage because the scanning frequency, the scanning angle, and the neutral scanning position may drift away from the desired values due to temperature changes, material aging, or any other reasons. Action 154 is followed by action 158.

In action 158, sensor 404 is used to monitor the motion of the scanning mirror (e.g., the scanning frequency, the scanning angle, and the scanning neutral position) and the measured information is outputted to controller 406. Action 158 is followed by action 160.

In action 160, controller 406 receives the motion information from sensor 404. Controller 406 computes and provides the needed DC bias voltage and the needed AC drive voltage to voltage source 402. The servo-control of the DC bias voltage is accomplished by perturbing the amplitude of the DC bias voltage and sensing the change in the scanning angle. If the DC bias voltage is increased and the scanning angle is also increased at the same time, then the natural frequency is approaching the scanning frequency, and vice versa. It is generally more effective to maintain the scanning amplitude by controlling the natural frequency with DC bias voltage change if the Bode plot shows a high Q factor of the main natural frequency.

The servo-control of the AC drive voltage is accomplished by perturbing the amplitude, the frequency, and the vertical offset of the AC drive voltage and sensing the change in the scanning angle, the scanning frequency, and the scanning neutral position. The amplitude of the AC drive voltage is increased to increase the angle of rotation, and vice versa. The frequency of the AC drive voltage is increased to increase the scanning frequency, and vice versa. The vertical offset of the AC drive voltage is changed to optimize the scanning neutral position. Action 160 is followed by action 154 and the method continues in a feedback loop.

Figure 1G:
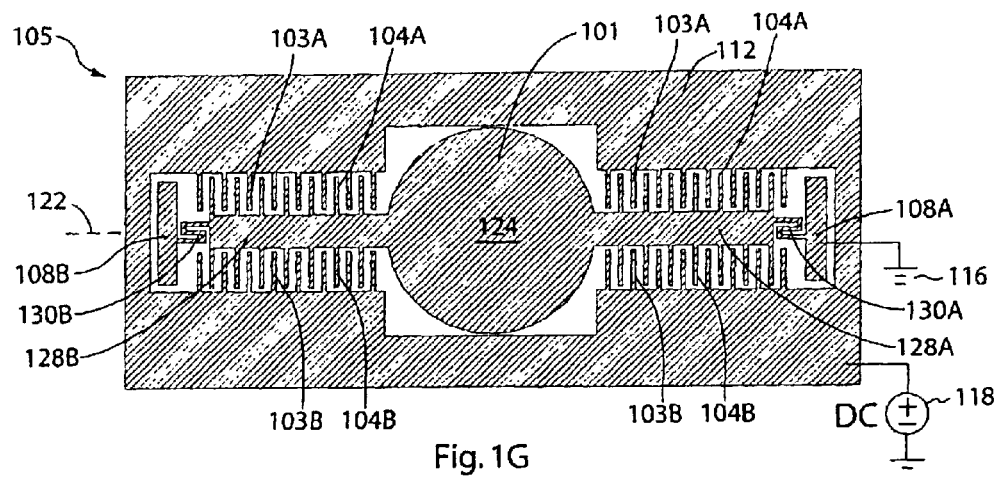
FIGS. 1G, 1H, 1I, and 1J illustrate top views of the various layers in MEMS structure 100 in different embodiments.

FIG. 1G illustrates a top view of another embodiment of conductive layer 105 of structure 100. Same or similar parts between FIGS. 1C and 1G are indicated by the same reference numerals. In this embodiment, reflective area 124 is connected to bars 128A and 128B. Moving teeth 104A and 104B extend from opposite edges of bars 128A and 128B. The ends of bars 128A and 128B are connected by torsion hinges 130A and 130B to anchors 108A and 108B, respectively. Each of torsion hinges 130A and 130B has a serpentine shape that increases translational stiffness but maintains the torsional flexibility of hinges 102A and 102B. Similarly described above, DC voltage source 118 is coupled to bias pad 112 and ground 116 is coupled to anchor 108A. Method 150 described above can be used to configure and operate a structure 100 with conductive layer 105 of FIG. 1G.

Figure 1H:
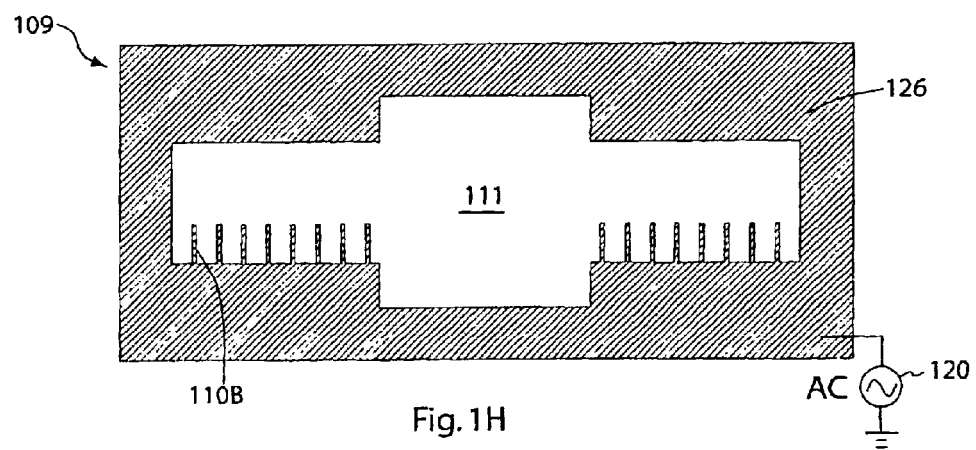

FIG. 1H illustrates a top view of another embodiment of conductive layer 109. Same or similar parts between FIGS. 1E and 1H are indicated by the same reference numerals. In this embodiment, drive pad 126 only includes stationary teeth 108. This configuration provides a large initial torque to excite the mirror rotational oscillation. The oscillating voltage difference between stationary teeth 110B and moving teeth 104B alone creates the scanning motion of mirror 101. However, the oscillating voltage difference may be increased to match the response amplitude of the above embodiment in FIG. 1E because layer 109 in this embodiment exerts a force with stationary teeth 110 on only one of the opposing sides. Method 150 described above can be used to configure and operate a structure 100 with conductive layer 109 of FIG. 1H.

Figure 1I:
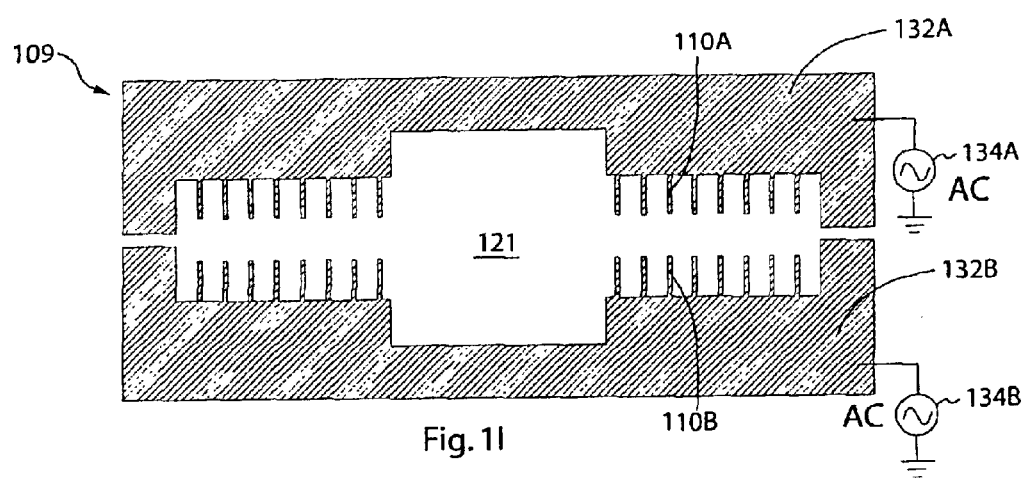

FIG. 1I illustrates a top view of another embodiment of conductive layer 109. Same or similar parts between FIGS. 1E and 1I are indicated by the same reference numerals. In this embodiment, conductive layer 109 is divided into two drive pads 132A and 132B (collectively "drive pads 132") that together define opening 121. Stationary teeth 110A and 110B extend from opposing edges of drive pads 132A and 132B, respectively. Drive pad 132A is coupled to an AC voltage source 134A while drive pad 132B is coupled to another AC voltage source 134B. AC voltage sources 134A and 134B have the same frequency but a phase difference of 180 degrees to provide the highest torsional actuation force and initial excitation torque. Thus, the oscillating voltage difference between stationary teeth 110 and moving teeth 104 creates the scanning motion of mirror 101. Method 150 described above can be used to configure and operate a structure 100 with conductive layer 109 of FIG. 1I.

Figure 1J:
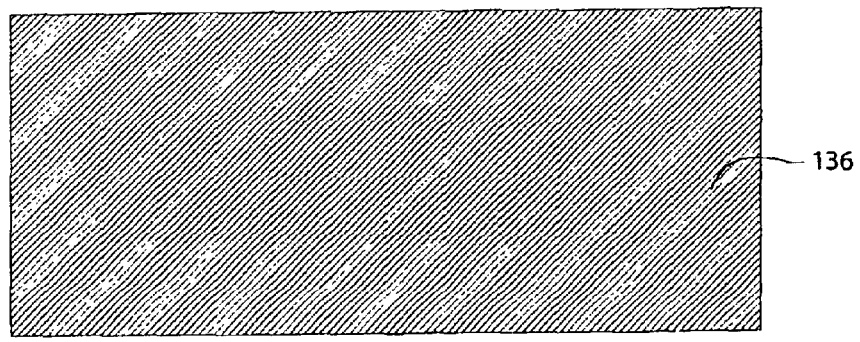

FIG. 1J illustrates a top view of an additional layer 136 below conductive layer 109 that electrically insulate drive pads 132A and 132B. In one embodiment, insulating layer 136 is made of intrinsic silicon. Insulating layer 136 may include a free space reserved for the scanning motion of mirror 101.

Figure 2A:
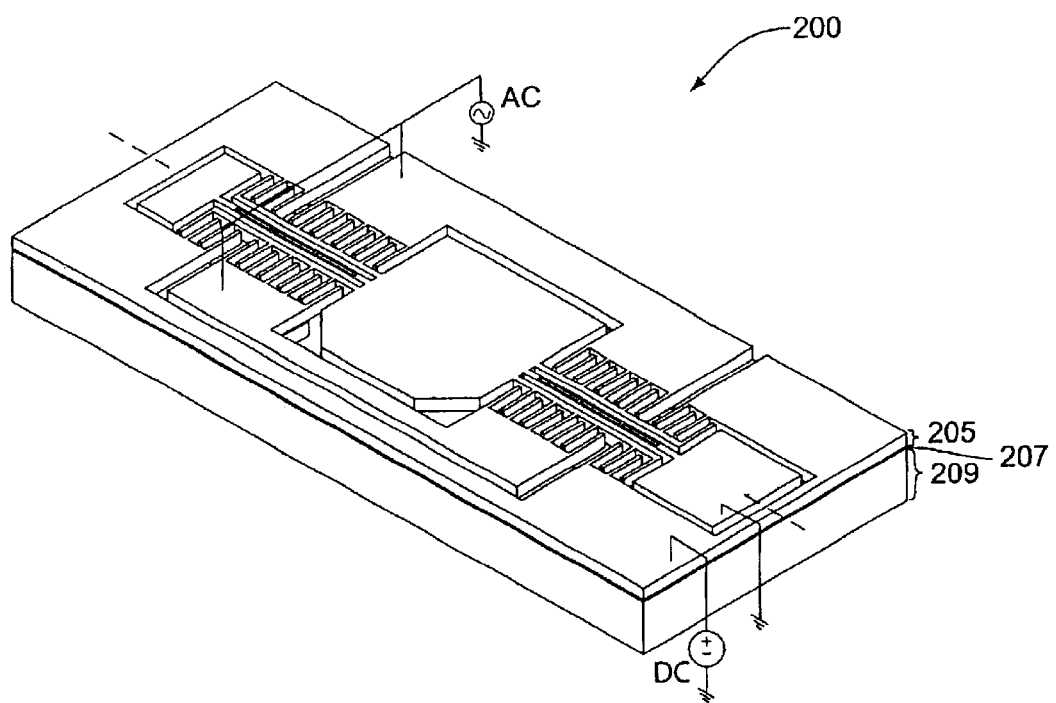
FIGS. 2A and 2B respectively illustrate assembled and exploded views of a MEMS structure 200 in one embodiment.
Figure 2B:
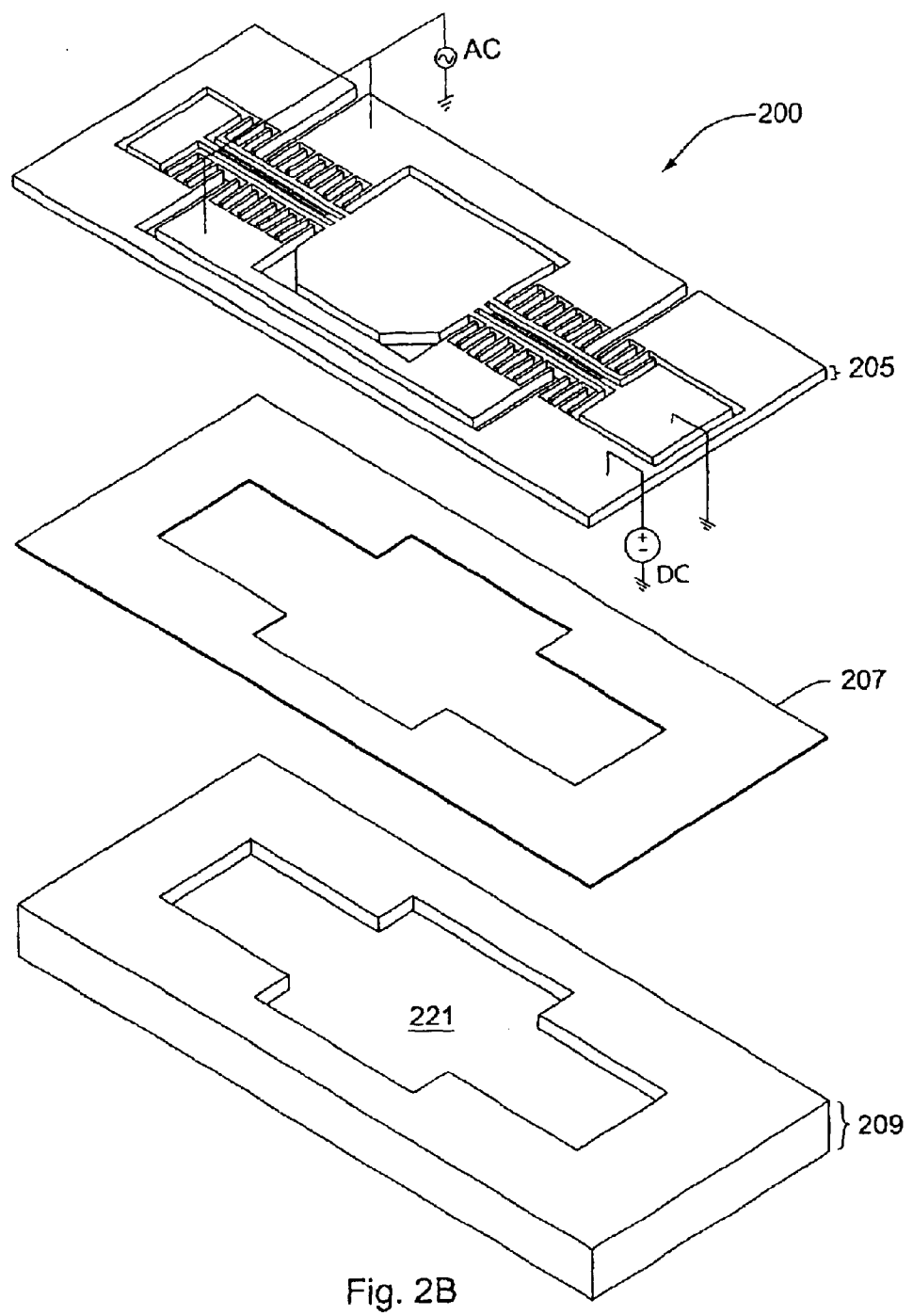

FIGS. 2A and 2B respectively illustrate assembled and exploded views of a MEMS structure 200 in one embodiment. Like MEMS structure 100, MEMS structure 200 can be used in any application that requires a single axis scanning mirror. MEMS structure 200 includes a conductive layer 205, an isolative and bonding layer 207, and a structure anchoring layer 209. In one embodiment, conductive layer 205 is made of doped silicon while isolative layer 207 is made of $SiO_2$ to electrically insulate elements of conductive layer 205. Layer 209 provides a support structure for the two upper layers. If layer 209 is made of non-conductive intrinsic silicon, layer 207 will only be used as a bonding layer and may be optional for this configuration.

Figure 2C:
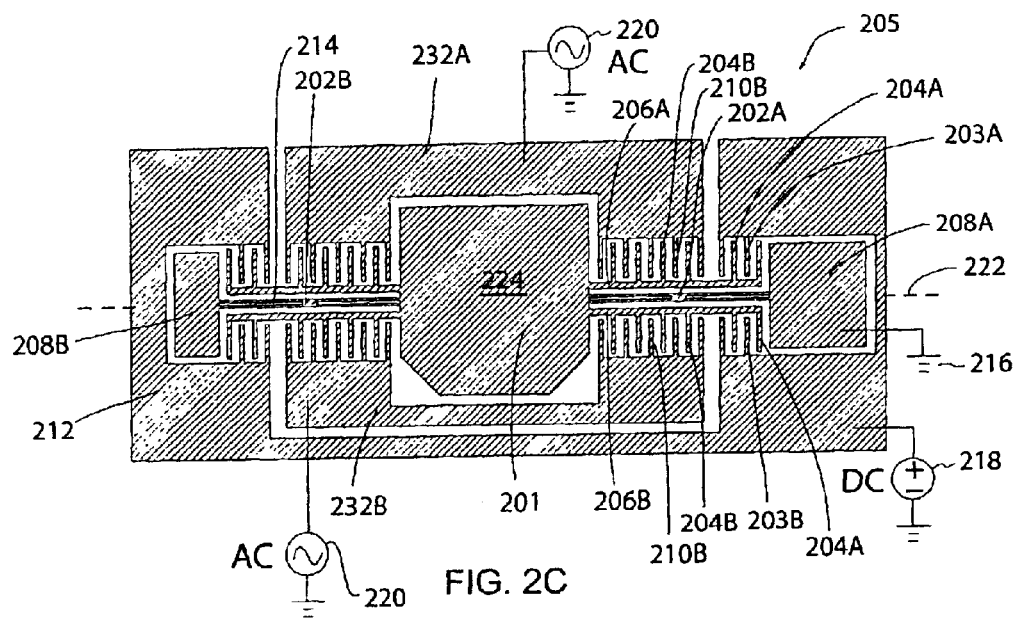
FIGS. 2C and 2D illustrate top views of the layers in MEMS structure 200 in one embodiment.

FIG. 2C illustrates a top view of one embodiment of conductive layer 205. Conductive layer 205 includes a scanning mirror 201, bias pad 212, and drive pads 232A and 232B. Similar to mirror 101, mirror 201 includes a reflective area 224 that is connected by torsion hinges 202A and 202B to anchors 208A and 209B, respectively. Mirror 201 rotates about an axis 222.

In one embodiment, torsion hinges 202A and 202B include internal holes 214 to lower the rotational modal frequency. Mirror 201 also includes a set of moving teeth 204A and 204B (collectively "moving teeth 204"). Moving teeth 204A and 204B extend from bars 206A and 206B, which are on different sides of axis 222. Bars 206A and 206B are connected to reflective area 224 and run parallel to torsion hinges 202A and 202B.

Inner moving teeth 204B are closer to reflective area 224 and are interdigitated with stationary teeth 210A and 210B (described later). Outer moving teeth 204A are farther from reflective area 224 and are interdigitated with stationary teeth 203A and 203B (described later).

In one embodiment, mirror 201 is asymmetric because it generally has a square shape with one or more corners removed. Thus, the center of gravity of mirror 201 is shifted to one side of the axis 222. Such a design may be preferred when an application requires mirror 201 to start at some initial rotational position or to reach some initial rotational position quickly.

Bias pad 212 includes stationary teeth 203A and 203B (collectively "stationary teeth 203") on the different sides of axis 222. Stationary teeth 203A and 203B are respectively interdigitated with outer moving teeth 204A when bias pad 212 and mirror 201 are in the same plane (e.g., when mirror 201 is not rotated).

Drive pads 232A and 232B (collectively "drive pads 232") respectively include stationary teeth 210A and 210B (collectively "stationary teeth 210"). Stationary teeth 210A and 210B are interdigitated with inner moving teeth 204B when drive pads 232 and mirror 201 are in the same plane.

In one embodiment, anchor 208A is coupled to ground 216 and bias pad 212 is coupled to a DC voltage source 218. DC voltage source 218 provides a DC bias voltage to bias pad 212 that creates a steady voltage difference between stationary teeth 203 and outer moving teeth 204A. Similarly described above, the steady voltage difference between stationary teeth 203 and moving teeth 204A creates an electrostatic force that changes the natural frequency of structure 200. Accordingly, the natural frequency of MEMS structure 200 can be tuned by changing the steady voltage difference between stationary teeth 203 and moving teeth 204A.

In one embodiment, stationary teeth 210 and moving teeth 204B form an electrostatic actuator (e.g., a comb drive actuator) that oscillates scanning mirror 201. In this embodiment, drive pads 232 are coupled to an AC voltage source 220. When activated, AC voltage source 220 provides an AC drive voltage to drive pads 232 that creates an oscillating voltage difference between stationary teeth 210 and inner moving teeth 204B. The oscillating voltage difference between stationary teeth 210 and inner moving teeth 204B causes electrostatic torque that creates the scanning motion of mirror 201.

Similarly described above, in one embodiment DC voltage source 218 and AC voltage source 220 are built on the same chip as structure 200. Alternatively, voltage sources 218 and 220 are built on one or more chips separate from structure 200. These one or more chips are then coupled to bias pad 212 and drive pads 232 via wires. In one embodiment, DC voltage source 218 is servo-controlled during operation to generate a DC bias voltage value that produces the desired natural frequency of structure 100, and AC voltage source 220 is servo-controlled during operation to generate an AC drive voltage that produces the desired scanning speed and scanning angle.

Figure 2D:
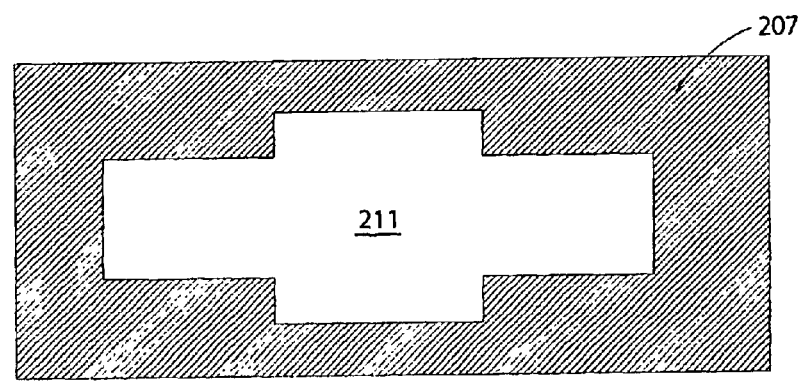

FIG. 2D illustrates a top view of one embodiment of isolative layer 207. Isolative layer 207 defines a cross-shaped opening 221. Similar to opening 121, opening 221 is a free space reserved for the scanning motion of mirror 201.

Method 150 (FIG. 1F) described above can be applied to operate structure 200.

Figure 3A:
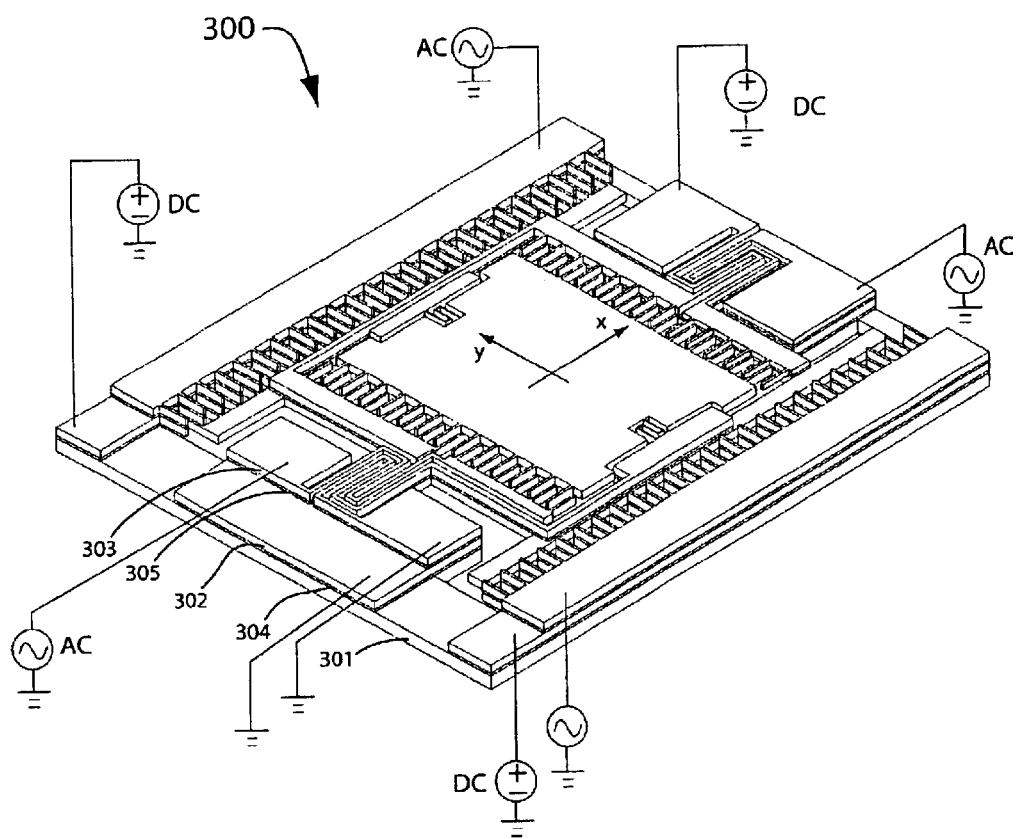
FIGS. 3A and 3B respectively illustrate assembled and exploded views of a MEMS structure 300 in one embodiment.
Figure 3B:
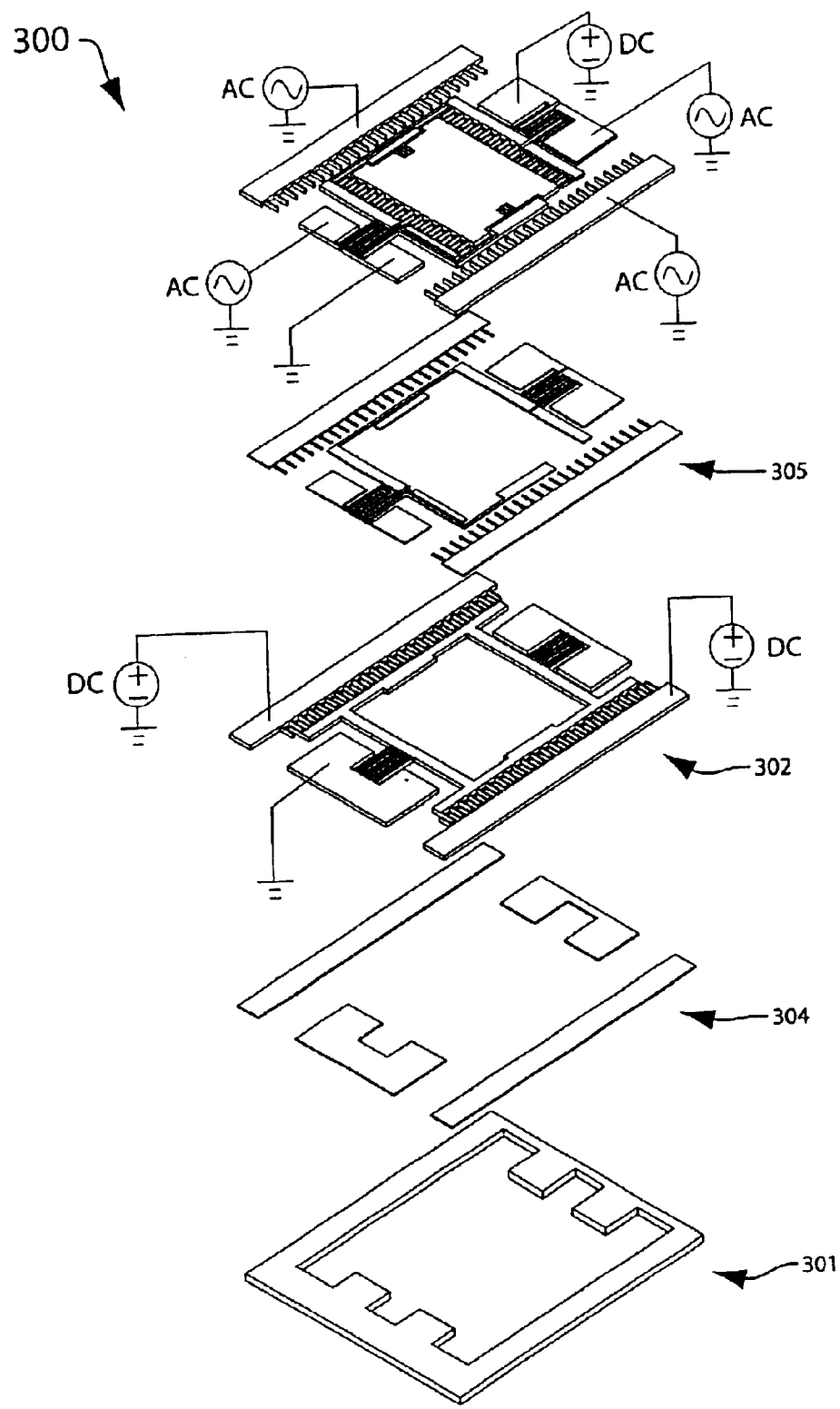

FIGS. 3A to 3B respectively illustrate assembled and exploded views of a MEMS structure 300 in one embodiment. MEMS structure 300 can be used in any application that requires rotational motion with respect to two rotational axes (e.g., a bidirectional scanning mirror). MEMS structure 300 includes a structure anchoring layer 301, an insulating layer 304, a conductive layer 302, an insulating layer 305, and a conductive layer 303. In one embodiment, layer 301 is made of intrinsic silicon or doped silicon, conductive layers 302 and 303 are made of doped silicon, and insulating layers 304 and 305 are made of silicon dioxide ($SiO_2$). Insulating layers 304 and 305 electrically insulate components on layers 301, 302, and 303. Insulating layer 304 is also used to physically bond layers 301 and 302. Similarly, insulating layer 305 is also used to physically bond conductive layers 302 and 303.

Figure 3C:
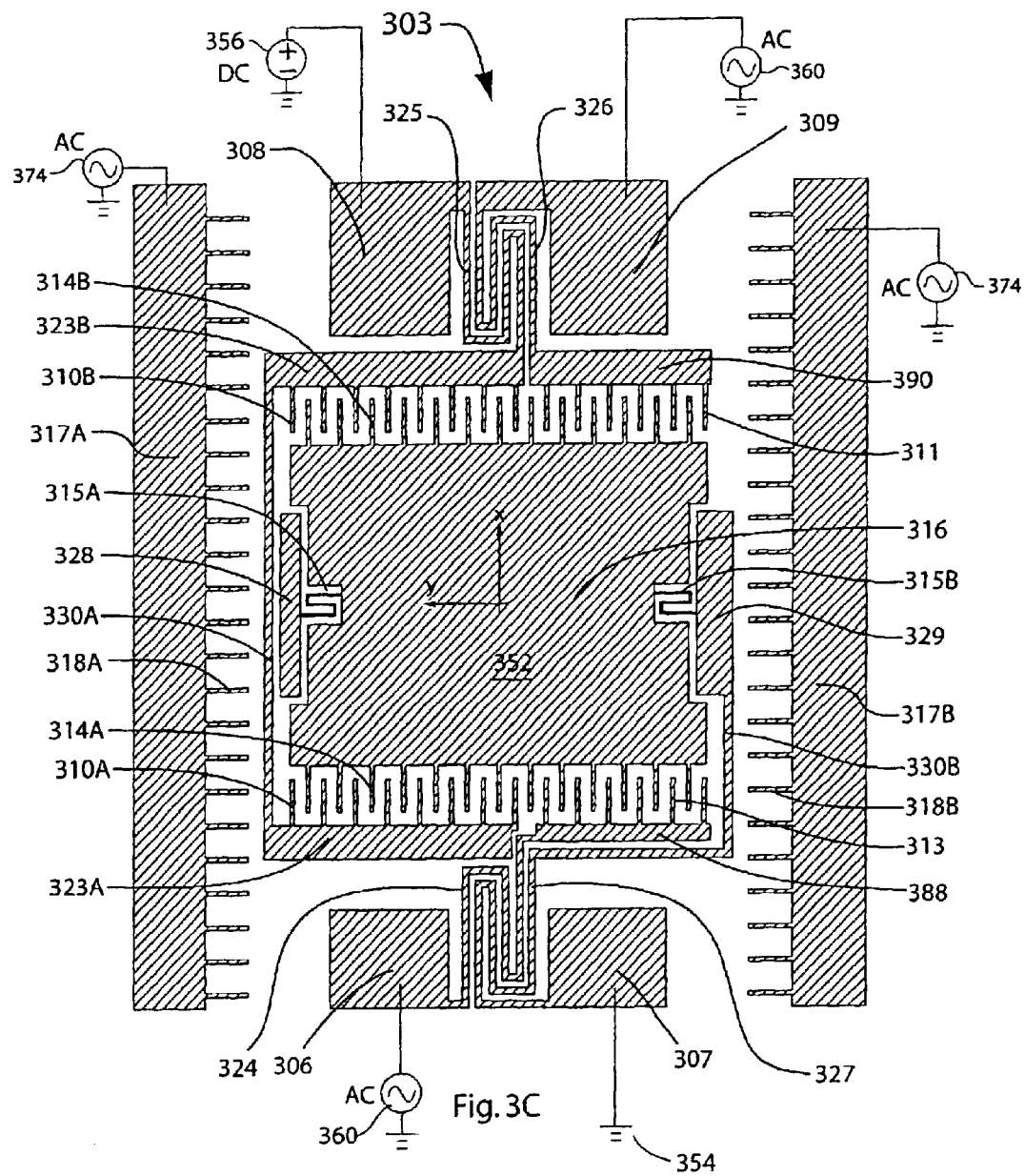
FIGS. 3C, 3D, 3E, 3F, and 3G illustrate top views of the layers in MEMS structure 300 in one embodiment.

FIG. 3C illustrates a top view of one embodiment of conductive layer 303. Conductive layer 303 includes a scanning mirror 316, drive pads 306 and 309, ground pad 307, and bias pad 308. Scanning mirror 316 includes a reflective area 352 that is connected by serpentine torsion hinges 31 SA and 315B to anchors 328 and 329, respectively. Mirror 316 rotates about the Y-axis via hinges 315A and 315B. Hinges 315A and 315B determine the mirror scanning frequency/speed in the Y-axis.

Mirror 316 includes moving teeth 314A and 314B (collectively "moving teeth 314") on different sides of the Y-axis. Drive pad 306 is connected by a serpentine torsion hinge 324 to a comb 388. Comb 388 has stationary teeth 313 that are interdigitated with some of moving teeth 314A when comb 388 and mirror 316 are in the same plane (e.g., when mirror 316 is not rotated about the Y-axis). Similarly, drive pad 309 is connected by a serpentine torsion hinge 326 to a comb 390. Comb 390 has stationary teeth 311 that are interdigitated with some of moving teeth 314B when mirror 316 is not rotated about the Y-axis.

Bias pad 308 is connected by a serpentine torsion hinge 325 to a comb 323B. Comb 323B is connected by a bar 330A to a comb 323A. Combs 323A and 323B respectively have stationary teeth 310A and 310B (collectively "stationary teeth 310"). Stationary teeth 310A and 310B are respectively interdigitated with some of moving teeth 314A and 314B when mirror 316 is not rotated about the Y-axis.

Ground pad 307 is connected by a serpentine torsion hinge 327 to an L-shaped bar 330B. Bar 330B is connected to anchor 329. Thus, ground pad 307 is connected to mirror 316 and moving teeth 314.

In one embodiment, ground pad 307 is coupled to ground 354 and bias pad 308 is coupled to a DC voltage source 356. DC voltage source 356 provides a DC bias voltage to bias pad 308. The DC bias voltage creates a steady voltage difference between stationary teeth 310 and moving teeth 314. As similarly described above, the steady voltage difference between stationary teeth 310 and moving teeth 314 creates a nonlinear electrostatic system that changes the natural frequency of MEMS structure 300 about the Y-axis. Accordingly, the natural frequency of MEMS structure 300 about the Y-axis can be changed (e.g., tuned) by changing the steady voltage difference between stationary teeth 310 and moving teeth 314.

As similarly described above, DC voltage source 356 can be built on the same chip as structure 300. Alternatively, DC voltage source 356 can be built on a chip separate from structure 300. In one embodiment, DC voltage source 356 is servo-controlled during operation to generate a DC bias voltage value that produces the desired natural frequency of structure 300 about the Y-axis.

In one embodiment, (1) stationary teeth 311 and moving teeth 314B and (2) stationary teeth 313 and moving teeth 314A form two electrostatic actuators (e.g., comb drive actuators) that oscillate scanning mirror 316 about the Y-axis. In this embodiment, drive pads 306 and 309 are coupled to an AC voltage source 360, and ground pad 307 is coupled to ground 354. When activated, AC voltage source 360 creates an oscillating voltage difference (1) between stationary teeth 311 and moving teeth 314B, and (2) between stationary teeth 313 and moving teeth 314A. Typically AC drive voltage has a frequency equal to the natural frequency of structure 300 to achieve the maximum scan angle. The oscillating voltage difference between the teeth causes electrostatic torques that create the scanning motion of mirror 316 about the Y-axis.

As similarly described above, in one embodiment AC voltage source 360 is built on the same chip as structure 300. Alternatively, AC voltage source 360 is built a chip separate from structure 300. In one embodiment, AC voltage source 360 is servo-controlled during operation to generate an AC drive voltage that produces the desired scanning speed and scanning angle about the Y-axis.

In one embodiment, conductive layer 303 further includes drive pads/combs 317A and 317B located on different sides of the X-axis. Combs 317A and 317B include stationary teeth 318A and 318B, respectively. Stationary teeth 318A and 318B are used to rotate mirror 316 about the X-axis (described later in reference to layer 302). Combs 317A and 317B are coupled to an AC voltage source 374 (described later).

Figure 3D:
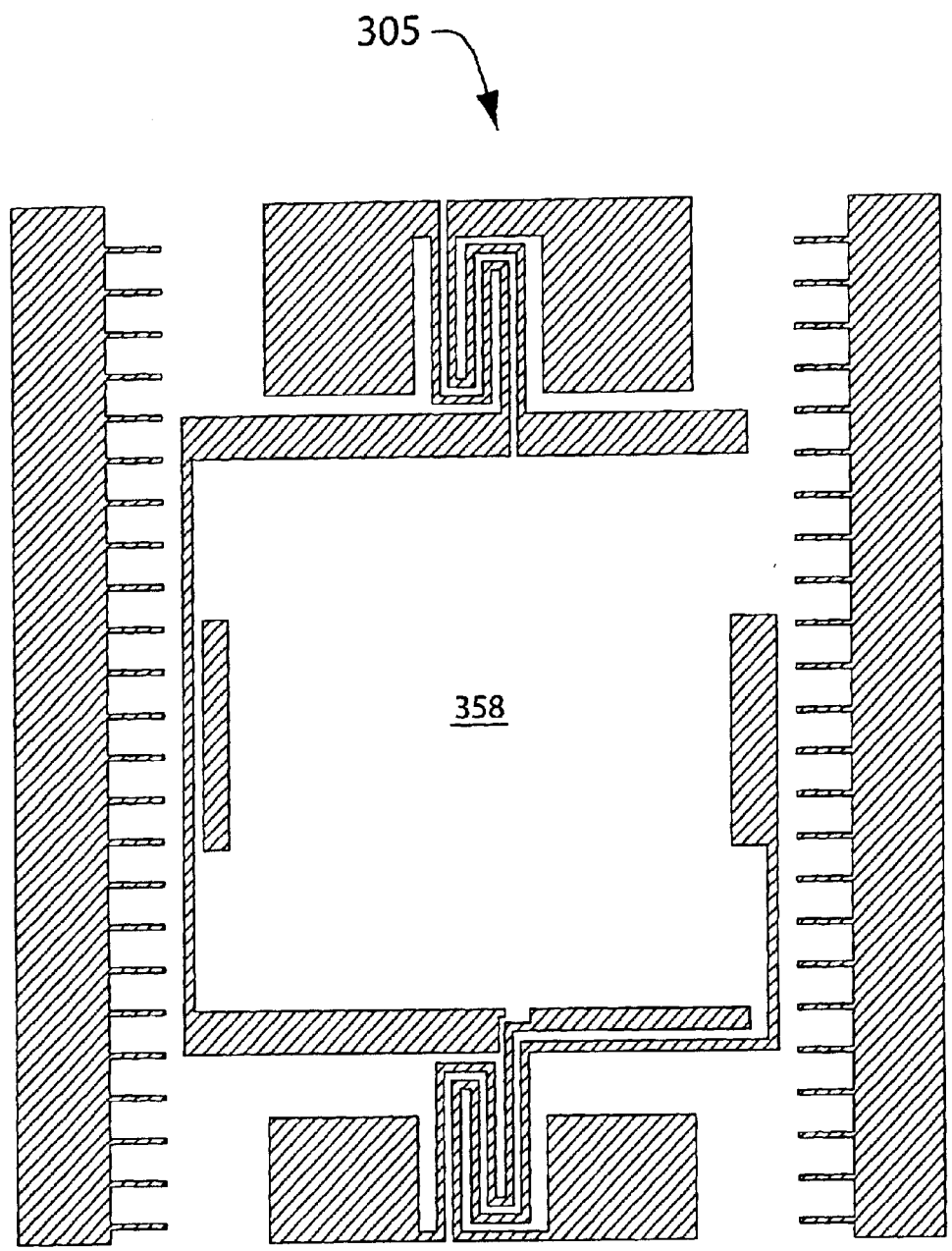

FIG. 3D illustrates a top view of one embodiment of insulating layer 305. Insulating layer 305 has the same shape as conductive layer 303 but for mirror 316 in order to electrically insulate the components on layer 303. Insulating layer 305 defines an opening 358 reserved for the scanning motion of mirror 316.

Figure 3E:
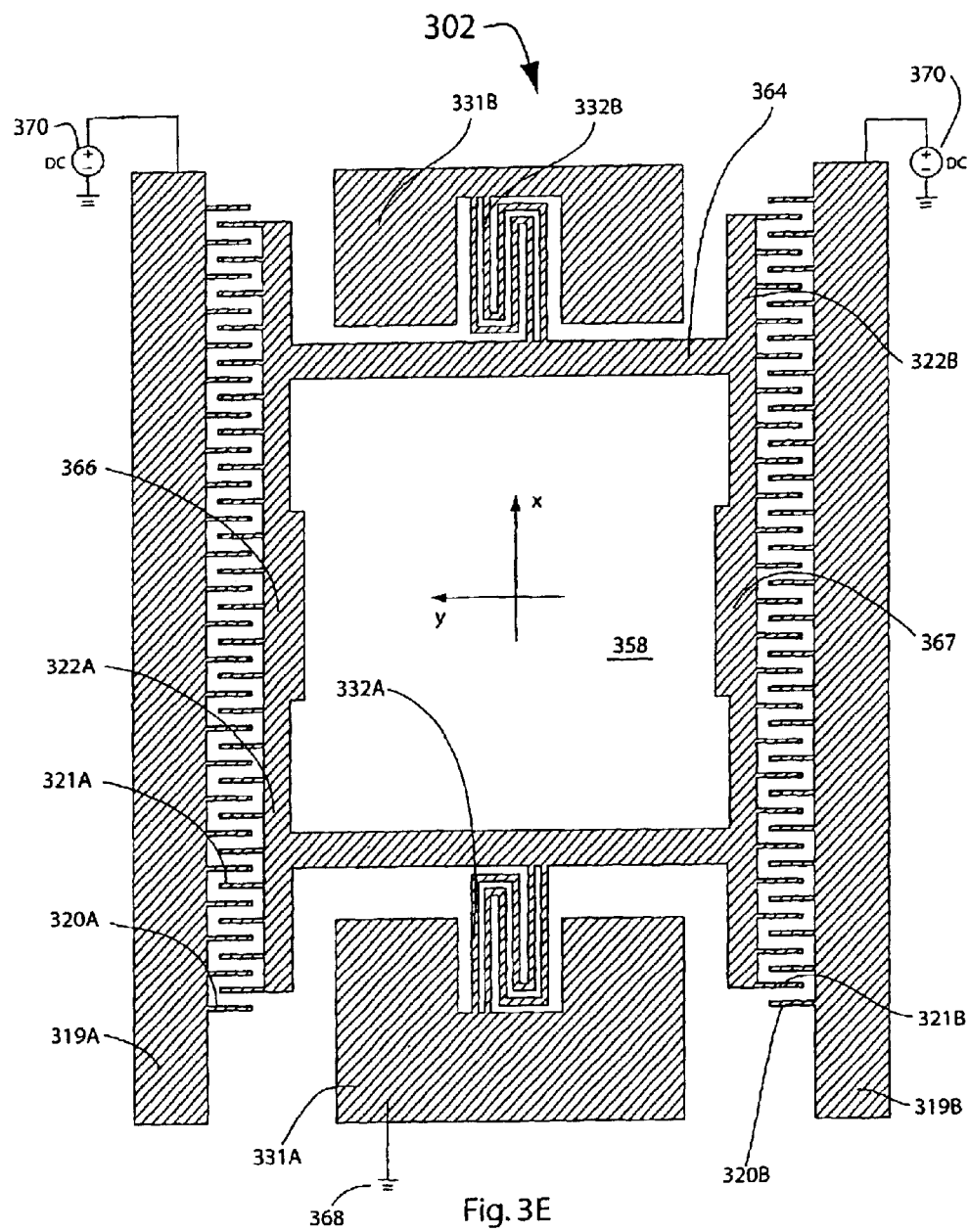

FIG. 3E illustrates a top view of one embodiment of conductive layer 302. Conductive layer 302 includes rotational frame 364 and bias pads/combs 319A and 319B. Rotational frame 364 defines an opening 358 for the scanning motion of mirror 316. Rotational frame 364 includes combs 322A and 322B on different sides of the X-axis. Rotational frame 364 is connected by serpentine torsion hinges 332A and 332B to grounding pads/anchors 331A and 331B, respectively. Rotational frame 364 can rotate about the X-axis via hinges 332A and 332B. Mirror 316 is mounted atop rotational frame 364. Specifically, anchors 328 and 329 of mirror 316 are respectively mounted atop of anchor mounts 366 and 367 of rotational frame 364. This allows mirror 316 to rotate about the Y-axis using hinges 315A and 315B, and about the X-axis using hinges 332A and 332B.

Combs 322A and 322B respectively include moving teeth 321A and 321B (collectively "moving teeth 321"). Combs 319A and 319B respectively include stationary teeth 320A and 320B (collectively "stationary teeth 320"); Stationary teeth 320A and 320B are respectively interdigitated with moving teeth 321A and 321B when combs 322A, combs 322B, and rotational frame 364 are in the same plane (e.g., when rotational frame 364 is not rotated about the X-axis).

In one embodiment, anchor 331A is coupled to ground 368, combs 319A and 319B are coupled to a DC voltage source 370. DC voltage source 370 provides DC bias voltages to comb 319A and 319B. The DC bias voltages create a steady voltage difference between stationary teeth 320 and moving teeth 321. As similarly described above, the steady voltage difference between stationary teeth 320 and moving teeth 321 creates a nonlinear electrostatic system that changes the natural frequency of MEMS structure 300 about the X-axis. Accordingly, the natural frequency of MEMS structure 300 about the X-axis can be changed (e.g., tuned) by changing the steady voltage difference between stationary teeth 320 and moving teeth 321.

As similarly described above, in one embodiment DC voltage source 370 is built on the same chip as structure 300. Alternatively, DC voltage source 370 is built on a chip separate from structure 300. In one embodiment, DC voltage source 370 is servo-controlled during operation to generate a DC bias voltage value that produces the desired natural frequency of structure 300 about the X-axis.

As described above, comb 317A and 317B (FIG. 3C) respectively have stationary teeth 318A and 318B (FIG. 3C). Moving teeth 321A (FIG. 3E) of rotational frame 364 (FIG. 3E) are interdigitated with stationary teeth 318A when mirror 316 (FIG. 3C) is rotated in a first direction, and moving teeth 321B (FIG. 3E) of rotational frame 364 are interdigitated with stationary teeth 318B when mirror 316 is rotated in the opposite direction.

In one embodiment, (1) stationary teeth 318A and moving teeth 321A and (2) stationary teeth 318B and moving teeth 321B form two electrostatic actuators (e.g., a comb drive actuators) that oscillate scanning mirror 316 about the X-axis. In this embodiment, combs 317A and 317B are coupled to an AC voltage source 374 (FIG. 3C) and ground pad 331A (FIG. 3E) is coupled to ground 368 (FIG. 3E). When activated, AC voltage source 374 creates an oscillating voltage difference between stationary teeth 318A and moving teeth 321A, and between stationary teeth 318B and moving teeth 321B. Typically the AC drive voltage has a frequency equal to the natural frequency of structure 300 to achieve the maximum scan angle. The oscillating voltage difference between the teeth causes electrostatic torques that create the scanning motion-of mirror 316 about the X-axis.

As similarly described above, in one embodiment AC voltage source 374 is built on the same chip as structure 300. Alternatively, AC voltage source 374 is built on a chip separate from structure 300. In one embodiment, AC voltage source 374 is servo-controlled during operation to generate an AC drive voltage that produces the desired scanning speed and scanning angle about the X-axis.

Figure 3F:
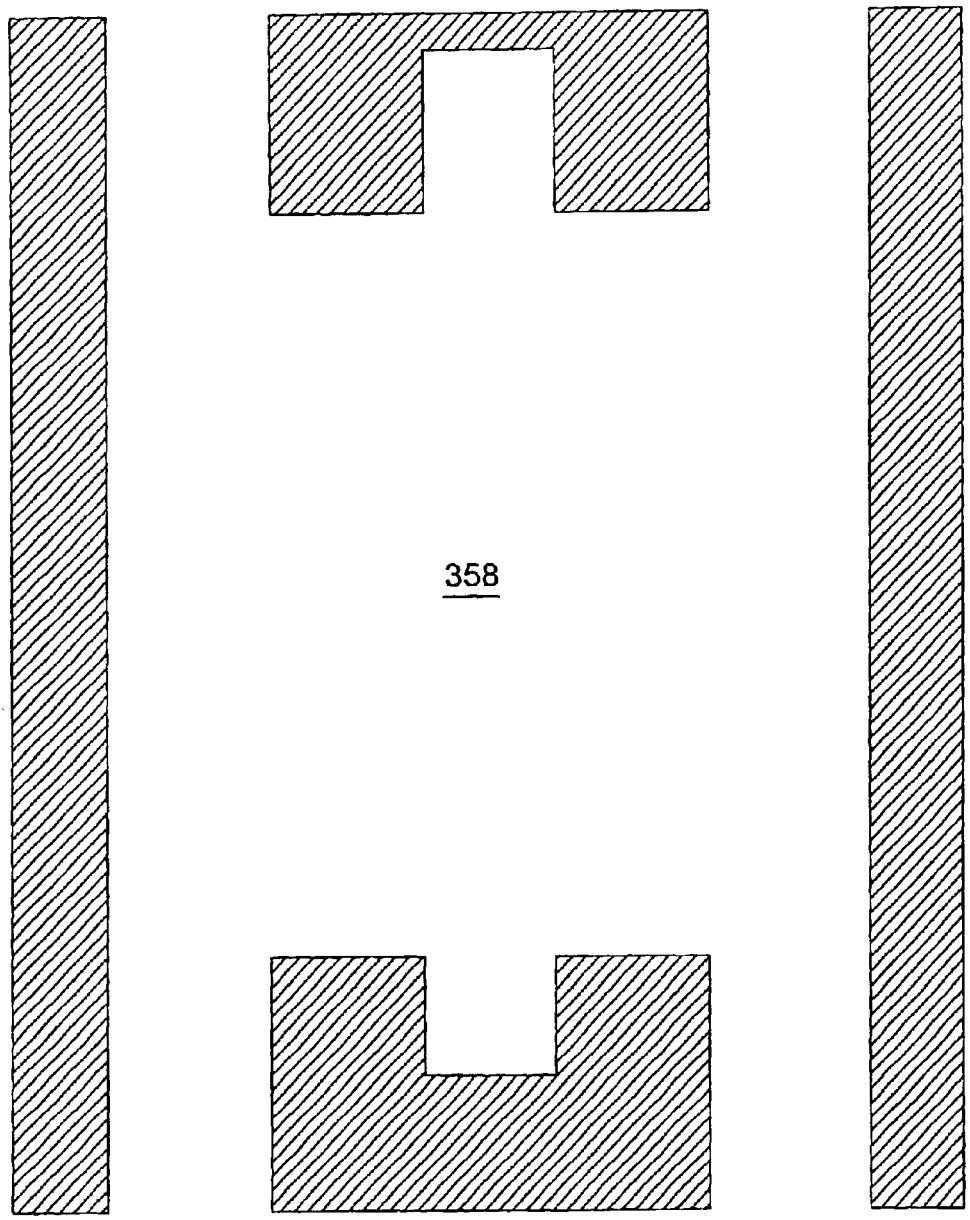

FIG. 3F illustrates a top view of one embodiment of insulating layer 304. Insulating layer 304 has the same shape as conductive layer 302, but for rotational frame 364, in order to electrically insulate the components on layer 302. Insulating layer 304 defines opening 358 reserved for the scanning motion of mirror 316 and rotational frame 364.

Figure 3G:
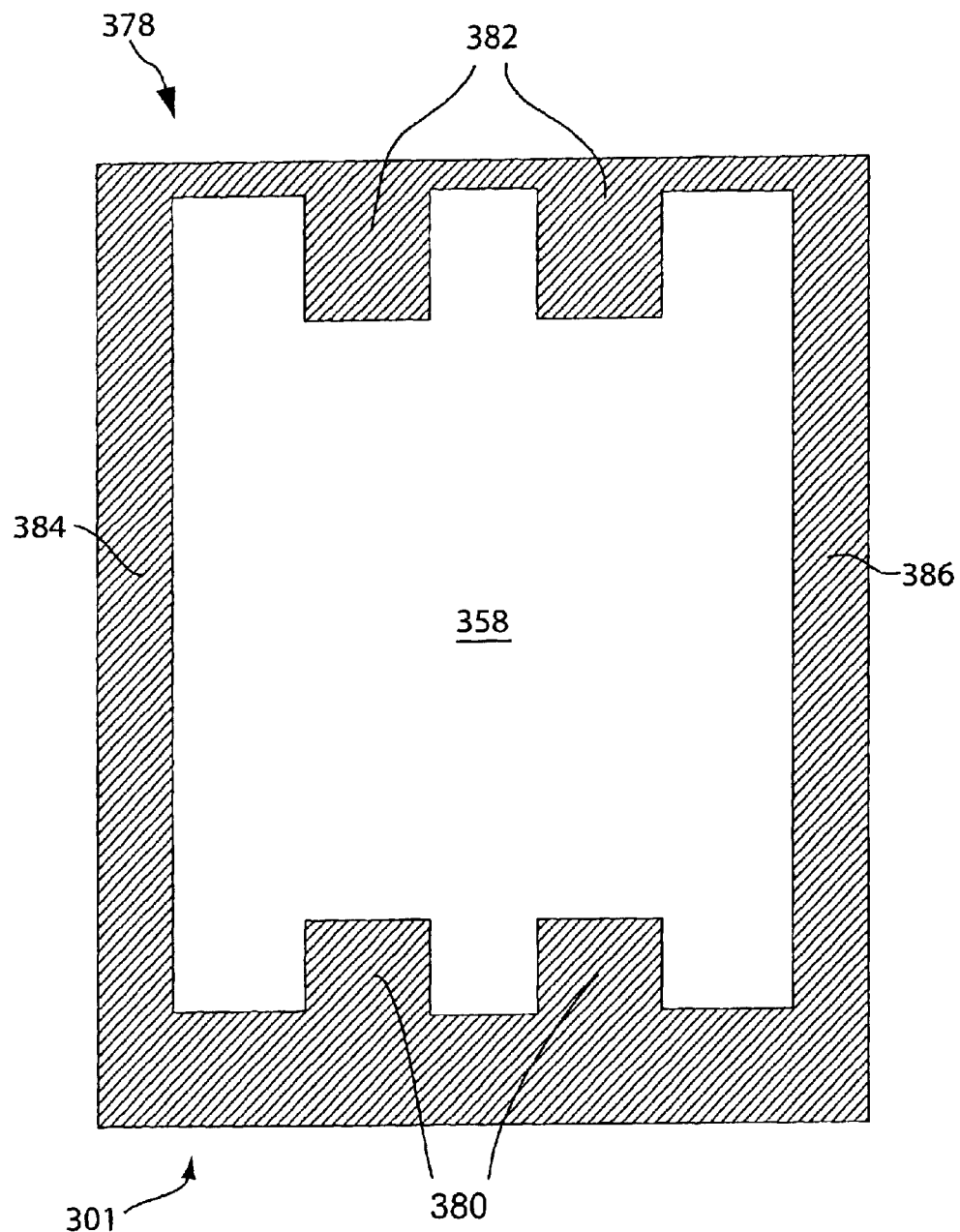

FIG. 3G illustrates a top view of one embodiment of structure anchoring layer 301. Layer 301 includes a frame 378 that defines opening 358 for the scanning motion of mirror 316 and rotational frame 364. Rotational frame 364 is mounted atop frame 378. Specifically, anchors 331A and 331B of rotational frame 364 are respectively mounted atop of anchor mounts 380 and 382 of frame 378. Combs 319A and 319B of conductive layer 302 are respectively mounted atop of comb mounts 384 and 386.

Method 150 (FIG. 1F) described above can be modified to configure and operate a MEMS structure 300 in one embodiment. Structure 300 is generally a device from a batch of mass produced structures 300.

In action 152, a designer determines the scanning frequencies and the scanning angles for both axes of rotation of an application and modifies the basic design of structure 300 to achieve specific natural frequencies equal to the scanning frequencies. The designer modifies the design by changing the stiffness of the hinges (e.g., the geometry of the hinges) or changing the inertia of the structure (e.g., the geometry of the mirror). Action 152 is followed by action 152.

In action 152, the designer presets the characteristics of the DC voltage differences for both axes of rotation to tune the natural frequencies of this structure 300 to the scanning frequencies. The designer also presets the characteristics of the AC voltage differences for both axes of rotation to achieve the desired scan angles and the desired neutral scanning positions about which the oscillation occurs. These characteristics are then stored into controller 406 for this structure 300 as the initial/default characteristics for the DC bias voltages and the AC drive voltages.

In action 153, an end user may store different characteristics for the DC bias voltages and the AC drive voltages in controller 406. The end user may wish to do so to change the desired scanning frequencies, the desired scanning angles, and the desired neutral scanning positions.

In action 154, controller 406 instructs voltage source 402 to apply the DC bias voltage and the AC drive voltage.

Voltage source 402 represents the various DC and AC voltage sources (e.g., DC voltage sources 356 and 370, and AC voltage sources 360 and 374).

The DC bias voltages are initiated with the default values stored in controller 406 and then servo-controlled to ensure the rotational natural frequencies are the scanning frequencies.

The AC drive voltages are initiated with the default values stored in controller 406 and then servo-controlled to ensure the desired scanning frequencies, the desired scanning angles, and the desired scanning neutral positions are achieved. Action 154 is followed by action 158.

In action 158, sensor 404 is used to monitor the motion of the scanning mirror and the measured information is outputted to controller 406. Action 158 is followed by action 160.

In action 160, controller 406 receives the scanning frequencies and angles information from sensor 404. Controller 406 computes and provides the needed DC bias voltages and the needed AC drive voltages to voltage source 402. Action 160 is followed by action 154 and the method continues in a feedback loop.

Various other adaptations and combinations of features of the embodiments disclosed are, within the scope of the invention. Numerous embodiments are encompassed by the following claims.

What is claimed is:

1. A MEMS structure, comprising:
    a first electrode coupled to a first voltage source;
    a second electrode coupled to a second voltage source;
    a rotatable frame comprising a third electrode coupled to a third voltage source, the frame being mounted to a support layer to rotate around a first axis;
    a fourth electrode coupled to a fourth voltage source;
    a fifth electrode coupled to a fifth voltage source;
    a rotatable element comprising a sixth electrode coupled to a sixth voltage source, the rotatable element being mounted to the frame to rotate around a second axis;
    wherein:
        a first steady voltage difference between the first electrode and the third electrode changes the natural frequency of the structure around the first axis to be at least approximately equal to a scanning frequency of an application around the first axis;
        a second steady voltage difference between the fourth electrode and the sixth electrode changes the natural frequency of the structure around the second axis to be at least approximately equal to a scanning frequency of the application around the second axis,
        a first oscillating voltage difference between the second electrode and the third electrode at the first scanning frequency oscillates the rotatable element around the first axis; and
        a second oscillating voltage difference between the fifth electrode and the sixth electrode at the second scanning frequency oscillates the rotatable element around the second axis.

2. The MEMS structure of claim 1, wherein the first voltage source is a first DC voltage source, the second voltage source is a first AC voltage source, and the third voltage source is ground.

3. The MEMS structure of claim 2, wherein the frame further comprises a torsion spring mounted atop the supporting layer, and the third electrode comprises a first plurality of teeth extending from the frame.

4. The MEMS structure of claim 3, wherein the first electrode comprises a second plurality of teeth mounted atop the supporting layer and interdigitated with the first plurality of teeth when the frame is not rotated.

5. The MEMS structure of claim 4, wherein the second electrode comprises a third plurality of teeth above the second plurality of teeth, the third plurality of teeth being interdigitated with the first plurality of teeth when the frame is rotated.

6. The MEMS structure of claim 2, wherein the fourth voltage source is a second DC voltage source, the fifth voltage source is a second AC voltage source, and the sixth voltage source is ground.

7. The MEMS structure of claim 6, wherein the rotating element is a scanning mirror comprising a reflective area coupled to a torsion spring mounted atop the frame, and the sixth electrode comprises a first plurality of teeth extending from the reflective area.

8. The MEMS structure of claim 7, wherein the fourth electrode comprises a second plurality of teeth interdigitated with at least part of the first plurality of teeth when the frame is not rotated.

9. The MEMS structure of claim 8, wherein the fifth electrode comprises a third plurality of teeth interdigitated with at least part of the first plurality of teeth when the frame is not rotated.

10. The structure of claim 6, wherein the first DC voltage source, the second DC voltage source, the first AC voltage source, and the second AC voltage source are located on the same chip as the structure.

11. The structure of claim 2, wherein at least one the first DC voltage source, the second DC voltage source, the first AC voltage source, and the second AC voltage source is located on a different chip than the structure.

12. A MEMS structure, comprising:
    a first layer comprising an electrically insulating material;
    a second layer atop the first layer, the second layer comprising:
        a frame comprising a first plurality of teeth extending from one or more edges of the frame, the frame being coupled to a first anchor by a first torsion hinge for rotation around a first axis, the first anchor being electrically coupled to ground;
        a first bias pad comprising a second plurality of teeth, the first bias pad being coupled to a first DC voltage source, the first and the second pluralities of teeth being interdigitated when the frame is not rotated;
    a third layer atop the second layer, the third layer comprising the electrically insulating material;
    a fourth layer atop the third layer, the fourth layer comprising:
        a mirror comprising a third plurality of teeth extending from one or more edges of the mirror, the mirror being coupled to a second anchor by a second torsion hinge for rotation around a second axis, the second anchor being electrically coupled to ground, the second anchor being mounted to the frame atop the third layer;
        a second bias pad comprising a fourth plurality of teeth, the second bias pad being coupled to a second DC voltage source, the third and the fourth plurality of teeth being interdigitated when the mirror is not rotated;
        a first drive pad comprising a fifth plurality of teeth, the first drive pad being coupled to a first AC voltage source, the third and the fifth pluralities of teeth being interdigitated when the mirror is not rotated;

a second drive pad comprising a sixth plurality of teeth, the second drive pad being coupled to a second AC voltage source, the first and the sixth pluralities of teeth being interdigitated when the mirror is rotated about the second axis;

wherein:

a first steady voltage difference between the first and the second pluralities of teeth changes the natural frequency of the structure around the first axis to be at least approximately equal to a first scanning frequency of an application around the first axis;

a second steady voltage difference between the third and the fourth pluralities of teeth changes the natural frequency of the structure around the second axis to be at least approximately equal to a second scanning frequency of the application around the second axis;

a first oscillating voltage difference between the third and the fifth pluralities of teeth at the first scanning frequency oscillates the scanning mirror around the second axis; and a second oscillating voltage difference between the first and the sixth pluralities of teeth at the second scanning frequency oscillates the scanning mirror around the first axis.

13. A method for controlling a MEMS structure having a rotatable element mounted on a rotatable frame, comprising:

determining a first DC voltage difference between a first electrode and a second electrode of the rotatable element, the first DC voltage difference causing a first natural frequency of the structure around a second axis to be at least approximately equal to a first scanning frequency of an application around the second axis;

determining a second DC voltage difference between a third electrode and a fourth electrode of the rotatable frame, the second DC voltage difference causing a second natural frequency of the structure around a first axis to be at least approximately equal to a second scanning frequency of the application around the first axis;

recording the first and the second DC voltage differences for use in the application; and recording the first scanning frequency as a first drive frequency of a first AC voltage difference between a fifth electrode and the second electrode of the rotatable element for use in the application, the first AC voltage difference causing an oscillation of the mobile element around the second axis; and recording the second scanning frequency as a second drive frequency of a second AC voltage difference between a sixth electrode and the fourth electrode of the rotatable frame for use in the application, the second AC voltage difference causing an oscillation of the rotatable frame around the first axis.

14. The method of claim 13, wherein said determining the first DC voltage difference comprises:

applying a first DC bias voltage to the first electrode;

grounding the second electrode of the rotatable element; and adjusting an amplitude of the first DC bias voltage until the first natural frequency is at least approximately equal to the first scanning frequency.

15. The method of claim 14, wherein said determining the second DC voltage difference comprises:

applying a second DC bias voltage to the third electrode;

grounding the fourth electrode of the rotatable frame; and adjusting an amplitude of the second DC bias voltage until the second natural frequency is at least approximately equal to the second scanning frequency.

16. The method of claim 15, wherein said recording the first and the second DC voltage differences comprise programming the first DC bias voltage and the second DC bias voltage into a controller for operating the MEMS structure.

17. The method of claim 16, wherein said recording the first and the second scanning frequencies comprises programming the first and the second scanning frequencies into the controller.

18. The method of claim 13, further comprising:

grounding the second electrode;

applying the first DC bias voltage to the first electrode to cause the first DC voltage difference;

applying a first AC drive voltage at the first scanning frequency to the fifth electrode to cause the first AC voltage difference;

grounding the fourth electrode;

applying the second DC bias voltage to the third electrode to cause the second DC voltage difference; and applying a second AC drive voltage at the second scanning frequency to the sixth electrode to cause the second AC voltage difference.

19. A method for controlling a MEMS structure having a rotatable element mounted on a rotatable frame, comprising:

applying a first DC voltage difference between a first electrode and a second electrode of the rotatable element, the first DC voltage difference causing a first natural frequency of the structure around a first axis to be at least approximately equal to a first desired scanning frequency of an application around the first axis;

applying a second DC voltage difference between a third electrode and a fourth electrode of the rotatable frame, the second DC voltage difference causing a second natural frequency of the structure around a second axis to be at least approximately equal to a second desired scanning frequency of the application around the second axis;

applying a first AC voltage difference between a fifth electrode and the second electrode of the rotatable element at the first desired scanning frequency, the first AC voltage difference causing an oscillation of the rotatable element around the first axis; and applying a second AC voltage difference between a sixth electrode and the fourth electrode of the rotatable frame at the second desired scanning frequency, the second AC voltage difference causing an oscillation of the rotatable element around the second axis.

20. The method of claim 19, further comprising:

measuring a first scanning frequency and a first scanning angle of the rotatable element around the first axis;

comparing the measured first scanning frequency and the measured first scanning angle with the first desired scanning frequency and a first desired scanning angle; and adjusting the amplitude of the first DC voltage difference to change the first natural frequency to be at least approximately equal to the first desired scanning frequency.

21. The method of claim 20, further comprising:

adjusting at least one of an amplitude, a frequency, and a vertical offset of the first AC voltage difference to change at least one of the first scanning frequency, the first scanning angle, and a first neutral scanning position of the rotatable element.

22. The method of claim 20, further comprising:

measuring a second scanning frequency and a second scanning angle of the rotatable frame around the second axis;

comparing the measured second scanning frequency and the measured second scanning angle with the second desired scanning frequency and a second desired scanning angle; and adjusting the amplitude of the second DC voltage difference to change the second natural frequency to be at least approximately equal to the second desired scanning frequency.

23. The method of claim 22, further comprising:

adjusting at least one of an amplitude, a frequency, and a vertical offset of the second AC voltage difference to change at least one of the second scanning frequency, the second scanning angle, and a second neutral scanning position of the rotatable element.

24. The method of claim 19, wherein said applying the first DC voltage difference comprises:

applying a DC bias voltage to the first electrode; and grounding the second electrode.

25. The method of claim 24, wherein said applying the first AC voltage difference comprises applying an AC voltage to the fifth electrode.

26. The method of claim 25, wherein said applying the second DC voltage difference; comprises:

applying a DC bias voltage to the third electrode; and grounding the fourth electrode.

27. The method of claim 26, wherein said applying the second AC voltage difference comprises applying an AC bias voltage to the sixth electrode.

* * * * *